(12) United States Patent
Bonato et al.

(10) Patent No.: US 8,370,099 B2
(45) Date of Patent: Feb. 5, 2013

(54) METHOD OF CALIBRATING A MEASUREMENT SENSOR

(75) Inventors: Michel Bonato, Tournefeuille (FR); Luc Buron, Venerque (FR)

(73) Assignee: Continental Automotive France, Toulouse (FR)

( * ) Notice: Subject to any disclaimer, the term of this patent is extended or adjusted under 35 U.S.C. 154(b) by 255 days.

(21) Appl. No.: 12/867,060

(22) PCT Filed: Feb. 4, 2009

(86) PCT No.: PCT/EP2009/000742
§ 371 (c)(1),
(2), (4) Date: Aug. 11, 2010

(87) PCT Pub. No.: WO2009/103419
PCT Pub. Date: Aug. 27, 2009

(65) Prior Publication Data
US 2010/0312514 A1    Dec. 9, 2010

(30) Foreign Application Priority Data

Feb. 18, 2008  (FR) ..................................... 08 00853

(51) Int. Cl.
*G06F 19/00* (2011.01)
*G06F 11/30* (2006.01)

(52) U.S. Cl. ......... 702/104; 702/182; 702/183; 702/184

(58) Field of Classification Search .......... 702/104–108, 702/116–119, 182–186
See application file for complete search history.

(56) References Cited

U.S. PATENT DOCUMENTS

| 5,361,218 A | * | 11/1994 | Tripp et al. ..................... 702/88 |
| 6,487,787 B1 | * | 12/2002 | Nahum et al. .................. 33/706 |

FOREIGN PATENT DOCUMENTS

| EP | 1 505 371 A1 | 2/2005 |
| WO | 98/29741 A1 | 7/1998 |
| WO | 2006/118899 A1 | 11/2006 |

OTHER PUBLICATIONS

International Search Report, dated Apr. 23, 2009, from corresponding PCT application.

* cited by examiner

*Primary Examiner* — Phuong Huynh
(74) *Attorney, Agent, or Firm* — Young & Thompson

(57) ABSTRACT

Method of calibrating an angular sensor includes a transducer for converting a real value of a physical quantity ($\phi$), lying within an overall range of variations, into an electrical signal (VS1) according to a first predefined function f1(VS1=cos 2$\phi$+OB1) having a factor (OB1) liable to drift according to an external condition, the method including a first step of measuring known values of the physical quantity within the overall range of variations and with at least two values of an external condition, a step of determining a set of correcting parameters, a second step of measuring a known additional value of the physical quantity chosen in a restricted range of variations, and a step of adjusting the set of correcting parameters from the second measurement step.

9 Claims, No Drawings

METHOD OF CALIBRATING A MEASUREMENT SENSOR

The invention relates to a method of calibrating a sensor for measuring a physical quantity lying within an overall range of variations, the method comprising:
- a first measurement step, for determining a first series of measured values associated with a first series of known values of the physical quantity distributed within the overall range of variations and with at least two values of an external condition; and
- a step of determining, from the first series of measured values, a set of correcting parameters for taking into account a drift of the sensor according to the external condition.

Such a calibration method is widely known for any type of commercially available sensor. It makes it possible to correct any drift of a sensor sensitive to an external measurement condition, for example temperature, atmospheric pressure, moisture content, etc.

Thus, for example, to calibrate an angular sensor of the magnetostatic type, a first series of known values of the quantity to be measured (here an angle) is chosen, preferably values distributed over the entire range of possible variations of the quantity to be measured, for example a 0-180° range. To calibrate the sensor over the 0-180° range, known angle values, for example angles of 30°, 90° and 150°, are chosen. At least two different measurement conditions are then chosen, for example firstly the ambient temperature and secondly the maximum operating temperature of the sensor, as recommended by the sensor manufacturer. Next, a first series of measured values associated with the known angle values and with the chosen temperature values is determined. Finally, a set of correcting parameters are determined according to the relationships recommended by the manufacturer. In the example, the measurements taken for three different angles and two different temperatures enable up to six correcting parameters to be determined.

After calibration, the sensor is suitable for measuring the physical quantity over the entire range of possible variations of the physical quantity and over the entire range of possible variations of the external condition, with an overall precision specified by the manufacturer.

The precision of the sensor may be generally increased over a restricted range of variations of the physical quantity, by calibration over the restricted range. However, such a calibration over a restricted range reduces the precision of the sensor outside the restricted range. In other words, according to the known calibration method, increasing the performance of the sensor over a restricted measurement range reduces the performance of the sensor over the total range of possible variations of the physical quantity to be measured.

The subject of the invention is a method of calibrating a sensor that does not have the drawbacks of the known calibration method.

To do this, a method according to the invention, conforming moreover to a prior method as described above, is characterized in that it also includes:
- a second measurement step, for determining an additional measured value associated with a known additional value of the physical quantity chosen in a restricted range of variations included within the overall range of variations, and with at least two values of the external condition; and
- a step of adjusting a previously determined correcting parameter according to the measurement results of the second measurement step.

Thus, after having calibrated the sensor, as in the prior methods, over the entire range of possible variations of the quantity to be measured, the method according to the invention allows for one of the correcting parameters of the sensor to be adjusted on the basis of an additional measurement over a restricted range of possible variations of the quantity to be measured. Thus, according to the invention, the precision of the sensor is increased locally over the restricted range of variations. In addition, by adjusting a limited number of correcting parameters, for example one or two parameters, there is little or no degradation of the sensor precision outside the restricted range.

The choice of the one or more additional values used for the calibration and the choice of the one or more parameters to be adjusted depend on the technology of the sensor, on the influence of said one or more parameters on the precision of the sensor and on the restricted range over which it is desirable to increase the precision of the sensor.

In the example of a sensor comprising a transducer for converting a real value of the physical quantity $\phi$ into an electrical signal VS1 according to a first predefined function f1 having a factor OB1 liable to drift according to the external condition, it is possible for example to choose a known additional value of the physical quantity such that a small variation in the physical quantity around said known additional value results in a large variation of the associated electrical signal delivered by the transducer:

$$VS1 = \cos 2\phi + OB1 \quad (f1)$$

In the example of a sensor comprising a transducer as described above and a calculating means for determining (as a function of the electrical signal VS1 produced by the transducer and of the predefined function) the measured value of the physical quantity from the electrical signal reduced by a correcting factor OBP1 (said correcting factor OBP1 varying with the external condition according to a second predefined function f2 that includes at least one correcting parameter), the correcting parameter to be adjusted is for example a correcting parameter of the second predefined function associated, in the second function, with the external condition T:

$$OBP1 = TCO1 \times T + SO1 \quad (f2)$$

The invention will be better understood and other features and advantages will become apparent on reading the following description of an example of how a method according to the invention is implemented for calibrating an angular sensor of the magnetostatic type, such as the KMA 200® sensor sold by the company NXP.

The sensor comprises especially:
- a first transducer for converting an angle to be measured $\phi$ into a first electrical signal VS1 according to:

$$VS1 = \cos 2\phi + OB1;$$

- a second transducer for converting the angle to be measured $\phi$ into a second electrical signal VS2 according to:

$$VS2 = \sin 2\phi + OB2.$$

The factors OB1 and OB2 correspond to offsets generated by the transducers, and it is necessary to subtract estimated values of the factors OB1 and OB2 from VS1 and VS2.

To do this, the sensor also includes a calculating means for determining a measured value of the angle $\phi$ to be measured according to the equation:

$$\phi = \frac{1}{2}\arctan\left(\frac{VS1-OBP1}{VS2-OBP2}\right)$$

where OBP1=TCO1×T+SO1 and OBP2=TCO2×T+SO2, i.e.:

$$\phi = \frac{1}{2}\arctan\left(\frac{VS1-(TCO1\times T+SO1)}{VS2-(TCO2\times T+SO2)}\right)$$

where TCO1, SO1, TCO2 and SO2 are correcting parameters for the temperature drift of the first transducer and of the second transducer.

A known calibration, which includes a first measurement step and a determination step as described in the prior art, of the present patent application makes it possible to calibrate the sensor, i.e. to determine an optimum value of the correcting parameters TCO1, SO1, TCO2 and SO2 over the overall range of possible variations of an angle φ to be measured and for temperatures liable to vary within a predefined range, so as to obtain the overall precision given by the manufacturer.

In the context of the invention, the known method is supplemented with:
- a second measurement step, for determining an additional measured value associated with a known additional value of the physical quantity chosen within a restricted range of variations, narrower than the overall range of variations, and with at least two values of the external condition; and
- a step of adjusting a previously determined correcting parameter according to the measurement results of the second measurement step.

In the example of the angular sensor, the second measurement step and the adjustment step enable the value of one of the correcting parameters TCO1, SO1, TCO2 or SO2 to be adjusted so as to increase the precision of the sensor over the restricted range of variations.

To carry out the second measurement step, an additional angle value for example chosen to be close to Φ×45°, Φ being a constant, i.e. a value close to 0°, 45°, 90°, 135°, etc. Thus, a small variation in the physical quantity to be measured, here the angle φ, around said known additional value results in a large variation in the associated electrical signal delivered by the first transducer or the second transducer. This 45° interval is due to the fact that the sine and cosine functions cancel each other out every 45° (since the functions are expressed in sin 2φ or in cos 2φ). Since the offsets OB1 and OB2 are relatively constant over the entire angular measurement range for this type of sensor, the electrical signal then undergoes relatively large variations.

Next, depending on the additional value chosen and in order to carry out the adjustment step, the correcting parameter to be adjusted is chosen to be either TCO1 if Φ is odd or TCO2 if Φ is even. In other words, the parameter chosen to be adjusted is the one that makes the greatest contribution to the final result, depending on the chosen additional angle value.

In practice, by implementing the method according to the invention with a KMA 200® sensor it is possible to obtain the following results:
- a known calibration over the 0-180° angle range for two temperatures, 25° C. and 130° C., makes it possible to obtain a sensor with an overall precision of 0.87° over the entire 0-180° range;
- the method according to the invention, by additional measurements for an angle of 10° and two temperatures, 25° C. and 130° C., enables the parameter TCO2 (associated with the sine function) to be adjusted so as to obtain a precision of around 0.48° over the 0-45° range, while maintaining a precision of 1° over the 45-180° range.

Experience also shows that:
- the choice of an additional angle value equal to Φ×45°, or one too close to Φ×45°, is not judicious: this choice enables the precision of the sensor in the vicinity of the Φ×45° range to be greatly increased, but to the detriment of the precision of the sensor over the 0-45° restricted range and to the detriment of the precision over the overall 0-180° range; and
- the choice of an additional angle value close to 22.5°+Φ× 45°, i.e. in the middle of the [Φ×45°; (Φ+1)×45°] range, is not judicious either, since the precision over the [Φ×45°; (Φ+1)×45°] range may be insufficient.

Thus, to obtain a substantial improvement in the precision over the restricted range [Φ×45°; (Φ+1)×45°] without degrading the precision over the overall range [Φ×180'; (Φ+1)×180°], it will be preferable to choose the known additional value of the physical quantity in the [Φ×45°+5°; Φ×45°+10°) range or in the [(Φ+1)×45°−10°; (Φ+1)×45°− 5°] range.

The invention claimed is:

1. A method of calibrating an angular sensor comprising a transducer for converting a real value of a physical quantity (φ), lying within an overall range of variations, into an electrical signal (VS1) according to a first predefined function f1(VS1=cos 2φ+OB1) having a factor (OB1) liable to drift according to an external condition, the method comprising:
    a first step of measuring known values of the physical quantity distributed within the overall range of variations and with at least two values of an external condition;
    a step of determining, from the first series of measured values, a set of correcting parameters for taking into account a drift of the sensor according to the external condition;
    a second step of measuring a known additional value of the physical quantity chosen in a restricted range of variations included within the overall range of variations, and with at least two values of the external condition; and
    a step of adjusting, using a processor the set of correcting parameters from the second measurement step, comprising a step of calculating a function of the electrical signal (VS1) produced by the transducer and of the first predefined function to determine the measured value of the physical quantity from the electrical signal reduced by a correcting factor (OBP1), said correcting factor (OBP1) varying with the external condition according to a second predefined function f2(OBP1=TCO1×T+SO1) that includes at least one correction parameter, wherein the at least one correcting parameter is defined in the second predefined function associated with the external condition (T) wherein TCO1 and SO1 are correcting parameters for the temperature drift of the first transducer to carry out the second measurement step.

2. The calibration method as claimed in claim 1, for an angular sensor of the magnetostatic type liable to drift according to an external temperature, said sensor comprising:
    a first transducer for converting an angle to be measured into a first electrical signal, VS1=cos 2φ+OB1; and
    a second transducer for converting the angle to be measured into a second electrical signal, VS2=sin 2φ+OB2;
    wherein,
    a measured value of the angle φ is determined by the equation:

$$\phi = \frac{1}{2} \arctan\left( \frac{VS1 - (TCO1 \times T + SO1)}{VS2 - (TCO2 \times T + SO2)} \right)$$

TCO1, SO1, TCO2 and SO2 are correcting parameters for the temperature drift of the first transducer and of the second transducer to carry out the second measurement step, the known additional value of the physical quantity is chosen to be close to Φ×45°, but different from Φ×45°, Φ being a constant, and in which, to carry out the adjustment step, and the correcting parameter to be adjusted is the parameter TCO1 if Φ is odd or the parameter TCO2 if Φ is even.

3. The method as claimed in claim 2, in which the known additional value of the physical quantity is chosen is chosen in the [Φ×45°−10°; Φ×45°−5°] range or in the [Φ×45°+5°; Φ×45°+10°] range.

4. The method as claimed in claim 1, to carry out the second measurement step, the known additional value of the physical quantity is chosen such that a small variation in the physical quantity around said known additional value results in a large variation in the associated electrical signal delivered by the transducer.

5. The method as claimed in claim 2, to carry out the second measurement step, the known additional value of the physical quantity is chosen such that a small variation in the physical quantity around said known additional value results in a large variation in the associated electrical signal delivered by the transducer.

6. The method as claimed in claim 3, to carry out the second measurement step, the known additional value of the physical quantity is chosen such that a small variation in the physical quantity around said known additional value results in a large variation in the associated electrical signal delivered by the transducer.

7. The method of claim 1, wherein the external condition is at least one of temperature, atmospheric pressure, or moisture content.

8. The method of claim 1, wherein a variable (ϕ) is at least one of 0°, 45°, 90°, or 135°.

9. The method of claim 2, wherein a variable (ϕ) is at least one of 0°, 45°, 90°, or 135°.

* * * * *